Patented Jan. 3, 1950

2,493,471

UNITED STATES PATENT OFFICE 2,493,471

STABILIZED ORGANIC COMPOUNDS AND METHODS OF OBTAINING THE SAME

Edward W. Tillitson, Grosse Pointe, Mich., assignor to Parke, Davis & Company, Detroit, Mich., a corporation of Michigan No Drawing. Application June 4, 1945, Serial No. 597,598

18 Claims. (Cl. 260—570.6)

The invention relates to the stabilization of sympathomimetic drugs and compositions containing the same.

More particularly, the invention relates to the stabilization of compositions containing sympathomimetic drugs, having hydroxylated aromatic nuclei, against discoloration or oxidation, or other undesirable chemical and physical deterioration or alteration. These sympathomimetic drugs may be represented by the general formula,

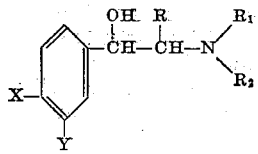

where X and Y are members of the class consisting of —H and —OH, at least one of X and Y being —OH, and R, $R_1$ and $R_2$ are members of the class consisting of —H and —$CH_3$.

Some specific examples of these hydroxylated aromatic compounds are the racemic mixtures and the d and l forms of: 1-(4'-hydroxyphenyl)-2-methylaminoethanol, 1-(3'-hydroxyphenyl)-2-methylaminoethanol, 1-(4'-hydroxyphenyl) - 2 - methylamino-propan - 1 - ol, 1-(3',4'-dihydroxyphenyl) - 2 - methylamino-ethanol, 1-(3',4-dihydroxyphenyl)-2-amino-ethanol and 1-(3',4'-dihydroxyphenyl)-2-amino-propan-1-ol.

It has been the practice in the past to stabilize solutions of, and compositions containing, the above sympathomimetic drugs by the addition of sodium bisulfite.

However, even in the presence of the sodium bisulfite these products rapidly turn dark in color and lose a large percentage of their sympathomimetic activity. This decomposition takes place so rapidly that these products are unsatisfactory and unreliable at the end of a six-month period.

I have found that by adding relatively small inhibiting amounts of iminoaminomethanesulfinic acid compounds that solutions of, and compositions containing these very unstable sympathomimetic drugs are stabilized and that these products remain unaltered in color and/or sympathomimetic activity over a period of at least several years. The iminoaminomethanesulfinic acid compounds which I have found to satisfactorily stabilize these drugs may be represented by the general formula,

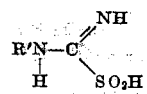

or by corresponding tautomeric formula,

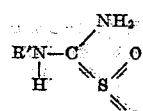

where R' is a member of the class consisting of hydrogen and lower alkyl radicals. I have found that very small amounts of iminoaminomethanesulfinic acid compounds will produce the desired stabilizing effect. These stabilizing compounds may be used in solutions of the above sympathomimetic drugs in quantities ranging from a small fraction of 1% up to about 3%. I have found that when using aqueous solutions it is seldom necessary to use more than about 1% of the stabilizer. I have also found that these inexpensive iminoaminomethanesulfinic acid compounds exercise their stabilizing action in the dry or liquid states of the sympathomimetic drugs of the present invention, as well as in solution of the same inorganic or aqueous solvents and in mixtures which, in addition to the compound to be stabilized, also contain other organic or inorganic substances of non-oxidizing nature. In general, the presence of a reducing substance in mixtures which contain the compound to be stabilized has no undesirable effect upon the stabilizing effect of the iminoaminomethanesulfinc acid compounds of the invention.

The sulfinic acids which I use as stabilizers may be prepared by the oxidation of the corresponding thioureas with a peroxide type of compound such as hydrogen peroxide.

Iminoaminomethanesulfinic acid,

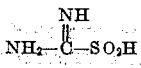

can be prepared as described in U. S. Patent No. 2,150,921 while the N-substituted iminoaminomethanesulfinic acids are similarly prepared, as illustrated by examples 11 and 12 below.

I have found that, in general, these various stabilizing sulfinic acids are at least twice as effective as sodium bisulfite for stabilizing these phenolic sympathomimetic drugs and that they are non-toxic and are well-tolerated when administered to animals or humans by the subcutaneous, intravenous or intramuscular routes as well as by the oral route.

More particularly, these iminoaminomethanesulfinic acids are at least as non-toxic as sodium bisulfite.

For example, the oral toxicity data for iminoaminomethanesulfinic acid in mice are: M. T. D. (maximum tolerated dose) 600 mg./kg. and M. L. D. (minimum lethal dose) 750 mg./kg. while the corresponding data for sodium bisulfite are: M. T. D. 750 mg./kg. and M. L. D. 900 mg./kg.

The invention is illustrated by the following examples.

Example 1

1.1 g. of epinephrine (1-1-(3',4'-dihydroxyphenyl)-2-methylamino-ethanol) is dissolved in 5.2 ml. of 4.2% hydrochloric acid and the solution added to a solution of 0.1 g. of iminoaminomethanesulfinic acid, 0.02 g. of p-tert-octyl-phenoxyethoxyethyldimethylbenzylammonium chloride monohydrate (a germicide), 0.05 g. of citric acid, and 0.48 g. of sodium chloride in 50 ml. of distilled water.

The resulting solution is diluted to 100 ml. with distilled water and sterilized by filtration through a Mandler filter.

The ph of the solution prepared in this manner is 2.81.

A control sample is prepared using the same quantities of reagents but substituting 0.1 g. of sodium bisulfite for the 0.1 g. of iminoaminomethanesulfinic acid in the above solution.

This control sample has a pH of 2.75.

Both samples are aged for two years, at the end of which time the control sample is a light yellow in color, has a pH of 2.55 and contains 80% of the original epinephrine activity.

The solution containing the iminoaminomethanesulfinic acid, however, has a pH of 4.25, is colorless and contains 100% of the original epinephrine activity.

To further demonstrate the stability of the solution containing the iminoaminomethanesulfinic acid, it may be placed in a nebulizer and aerated every fifteen minutes for five hours and allowed to stand overnight.

Even this drastic treatment fails to cause any appreciable change in the color or activity of this stabilized solution.

Example 2

0.11 g. of epinephrine [1-1-(3',4'-dihydroxyphenyl)-2-methylamino-ethanol] is dissolved in 0.7 ml. of 4.2% hydrochloric acid and to this solution is added a solution of 0.1 g. of iminoaminomethanesulfinic acid, 0.02 g. of p-tert-octylphenoxyethoxyethyldimethylbenzylammonium chloride monohydrate (a germicide), 0.05 g. of citric acid and 0.80 g. of sodium chloride in 50 ml. of distilled water.

The resulting solution is diluted to 100 ml. with distilled water and sterilized by filtration through a Mandler filter.

The pH of this colorless solution is 2.53.

A control sample is prepared in the same manner, using the same quantities of reagents but substituting 0.1 g. of sodium bisulfite for the 0.1 g. of iminoaminomethanesulfinic acid.

The pH of this colorless solution is 2.81.

Both the bisulfite control sample and the iminoaminomethanesulfinic acid stabilized sample are aged for two years, at the end of which time their pH's are 2.60 and 4.15 respectively.

The control sample is colorless but contains only 80% of the original epinephrine activity while the iminoaminomethanesulfinic acid stabilized sample is also colorless but contains 100% of the original epinephrine activity.

When the two samples are aerated as described in Example 1, the bisulfite stabilized sample turns a brownish color while the iminoaminomethanesulfinic acid stabilized sample is unchanged by this treatment.

Example 3

1.1 g. of epinephrine [1-1(3',4'-dihydroxyphenyl)-2-methylamino-ethanol] is dissolved in 5.2 ml. of 4.2% hydrochloric acid and to this solution is added a solution of 0.1 g. of iminoaminomethanesulfinic acid, 0.5 g. of 2-trichloromethyl-2-propanol (a germicide), sufficient dextrose to make the preparation isotonic when diluted to 100 ml., and 0.5 g. of citric acid in 50 ml. of distilled water.

The resulting solution is diluted to 100 ml. with distilled water and sterilized by filtration through a Mandler filter. This colorless preparation has a pH of 2.88.

A control sample is prepared in the same manner using the same quantities of reagents but substituting 0.1 g. of sodium bisulfite for the 0.1 g. of iminoaminomethanesulfinic acid. This colorless solution has a pH of 2.67.

Both the control sample and the iminoaminomethanesulfinic acid stabilized sample are aged for two years at the end of which time the pH's of the two solutions are 2.61 and 4.48 respectively. The bisulfite stabilized solution is brown in color and contains only 75% of the original epinephrine activity while the iminoaminomethansulfinic acid stabilized sample is colorless and contains 100% of the original epinephrine actvity.

Example 4

1.1 g. of epinephrine [1-1-(3',4'-dihydroxyphenyl)-2-methylamino-ethanol] is dissolved in 5.2 ml. of 4.2% hydrochloric acid and the solution added to a solution of 0.1 g. of iminoaminomethanesulfinic acid, about 0.5 g. of sodium chloride and 0.5 g. of 2-trichloromethyl-2-propanol (a germicide) in 50 ml. of distilled water. The resulting solution is diluted to 100 ml. and sterilized by filtration through a Mandler filter. This colorless solution has a pH of 2.90.

A control sample is prepared in the same manner using 0.1 g. of sodium bisulfite as a stabilizer instead of 0.1 g. iminoaminomethanesulfinic acid. This control solution has a pH of 2.65.

The control sample and the iminoaminomethanesulfinic acid stabilized sample are aged for two years, at the end of which time the pH's of the solutions are 2.38 and 2.94 respectively. The control sample is dark brown in color and contains only 75% of the original epinephrine activity while the iminoamineomethanesulfinic acid stabilized sample is only a very light brown color and contains 100% of the original epinephrine activity.

Example 5

0.11 g. of epinephrine [1-1-(3',4'-dihydroxyphenyl)-2-methylamino-ethanol] is dissolved in 0.7 ml. of 4.2% hydrochloric acid and to this solution is added a solution of 0.5 g. of 2-trichloromethyl-2-propanol (a germicide), 0.1 g.

of iminoaminomethanesulfinic acid and about 0.9 g. of sodium chloride in 50 ml. of distilled water. The resulting solution is diluted to 100 ml. with distilled water and stabilized by filtration through a Mandler filter. This colorless epinephrine preparation has a pH of 2.63.

A control sample is prepared which is stabilized with sodium bisulfite by replacing the 0.1 g. of iminoaminomethanesulfinic acid with 0.1 g. of sodium bisulfite in the above formula. This solution has a pH of 2.70.

The two solutions are aged for a period of two years, at end of which time the bisulfite stabilized solution has a pH of 2.57 and the iminoaminomethanesulfinic acid stabilized solution a pH of 3.68. Both solutions are colorless but the bisulfite stabilized solution contains only 80% of the original epinephrine activity whereas the iminoaminomethanesulfinic acid stabilized sample contains 100% of the original epinephrine activity. When both samples are aereated as described in Example 1, the control sample turns brown in color while the sulfinic acid stabilized sample is unaffected by this treatment.

Example 6

0.11 g. of epinephrine [l-1-(3',4'-dihydroxyphenyl)-2-methyamino-ethanol] is dissolved in 0.7 ml. of 4.2% hydrochloric acid and to this solution is added a solution of 0.05 g. of citric acid, 0.02 g. of p-tert-octylphenoxyethoxyethyldimethylbenzylammonium chloride monohydrate (a germicide), about 1.5 g. of dextrose and 0.1 g. of iminoaminomethanesulfinic acid in 50 ml. of distilled water. The resulting solution is diluted to 100 ml. with distilled water and sterilized by filtration through a Mandler filter.

A control sample stabilized with 0.1 g. of sodium bisulfite is prepared in the same manner and using the same quantities of reagents but omitting the iminoaminomethanesulfinic acid. The solution has a pH of 2.70.

Both samples are aged for two years, at the end of which time the bisulfite stabilized solution has a pH of 2.45 and the sulfinic acid stabilized solution has a pH of 4.2. The sulfinic acid stabilized solution is colorless and contains 100% of the original epinephrine activity, whereas the control sample is pink in color and contains about 90% of the original epinephrine activity. On aeration of the samples as described in Example 1, the iminoaminomethanesulfinic acid stabilized solution is unchanged, whereas the control sample turns brown in color and loses more of its epinephrine activity.

Example 7

1.0 g. of racemic 1-(4'-hydroxyphenyl)-2-methylaminoethanol is dissolved in 5 ml. or 4.5% hydrochloric acid and the resulting solution added to a solution of 0.05 g. of iminoaminomethanesulfinic acid, about 0.5 g. sodium chloride and 0.02 g. of p-tert-octylphenoxyethoxyethyldimethylbenzylammonium chloride monohydrate (a germicide) in 50 ml. of distilled water. The resulting solution is diluted to 100 ml. with distilled water and sterilized by filtration through a Mandler filter.

A control sample is prepared by replacing the 0.05 g. of iminoaminomethanesulfinic acid by 0.05 of sodium bisulfite in the above formula.

The two solutions are aged for a period of two years, at the end of which time the control sample is discolored and contains less sympathomimetic activity per ml. than the original solution, while the iminoaminomethanesulfinic acid stabilized solution remains unaffected both in color and activity.

Example 8

1.0 g. of racemic 1-(3',4'-dihydroxyphenyl)-2-aminopropan-1-ol is dissolved in 5 ml. of 4.2% hydrochloric acid and the solution added to a solution of 0.1 g. of n-butylamino-iminomethanesulfinic acid,

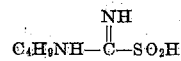

about 0.5 g. of sodium chloride and 0.5 g. of 2-trichloromethyl-2-propanol (a germicide) in 50 ml. of distilled water. The resulting solution is diluted to 100 ml. with distilled water and sterilized by filtration through a Mandler filter. This solution is stable and remains unchanged both in color and sympathomimetic activity even after standing for several years.

Example 9

1 g. of racemic 1-(4'-hydroxyphenyl)-2-methylamino-propan-1-ol is dissolved in 4 ml. of 5% hydrochloric acid and the resulting solution added to a solution of 0.1 g. of n-propylaminoiminomethanesulfinic acid and 0.6 g. of sodium chloride in 50 ml. of distilled water. The solution is diluted to 100 ml. with distilled water and sterilized by filtration through a Mandler filter. This solution remains colorless and unaffected in physiological activity even after aging for several years.

Example 10

1 g. of racemic 1-(3',4'-dihydroxyphenyl)-2-aminoethanol is dissolved in 5 ml. of 4.2% hydrochloric acid and to this solution is added a solution of 1 g. of iminoaminomethanesulfinic acid and 0.5 g. of sodium chloride dissolved in 95 ml. of distilled water. The resulting colorless solution is sterilized by filtration through a Mandler filter. This solution retains all of its sympathomimetic activity and remains colorless even after aging for several years.

Example 11.—Preparation of n-propylaminoiminomethanesulfinic acid

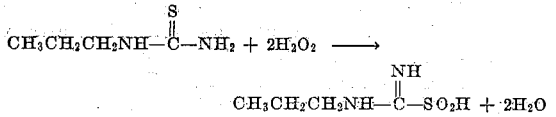

44 g. of n-propylthiourea is dissolved in 200 ml. of dioxane and 5 ml. of water. The mixture is cooled to about 6° C. By the addition of solid carbon dioxide and 25.4 g. (87.5 cc. of a 29% solution) of hydrogen peroxide added dropwise, with stirring keeping the temperature below 10° C. The reaction mixture is stirred at 10° C. for about two hours after all the hydrogen peroxide is added and then concentrated in vacuo. The yellow needles of the n-propylaminoiminosulfinic acid which separate are removed by filtration and washed with a small amount of absolute alcohol; M. P. 110–112° C. with effervescence to give a milky liquid.

A sample of this compound when dissolved in water absorbs iodine very slowly until a few drops of sodium acetate solution are added which immediately causes the disappearance of the iodine color.

*Example 12.—Preparation of n-butylaminoimino-methanesulfinic acid*

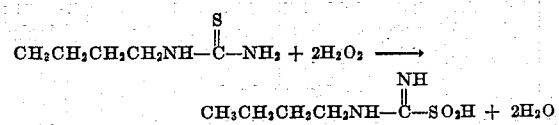

50 g. of n-butylthiourea is dissolved in a mixture of 20 ml. of water and 100 ml. of dioxane by warming. The solution is cooled to 0° C. and maintained below 10° C. while 89 cc. of 29% hydrogen peroxide solution is added dropwise with stirring. Stiring is continued for about two hours after all the hydrogen peroxide has been added and then the solid product removed by filtration. The crude n-butylaminoiminomethanesulfinic acid is recrystallized from water; M. P. 126° C. with effervescence. To prevent decomposition of the product during recrystallization, it is advisable to use sufficient water to effect solution of the material at about 50° C.

The iminoaminomethanesulfinic acid compounds which I use as stabilizers are non-toxic and are well tolerated when administered to animals or humans by the subcutaneous, intravenous or intramuscular routes as well as by the oral route. More particularly, these iminoaminomethanesulfinic acid compounds are at least as non-toxic as sodium bisulfite. For example, the oral toxicity data of iminoaminomethanesulfinic acid in mice are; M. T. D. (maximum tolerated dose) 600 mg./kg. and M. L. D. (minimum lethal dose) 750 mg./kg., while the corresponding toxicity data for sodium bisulfite are: M. T. D. 750 mg./kg. and M. L. D. 900 mg./kg.

I have found that the iminoaminomethanesulfinic acid compounds which I use are at least twice as effective as sodium bisulfite when used to prevent deterioration or alteration of the various unstable products mentioned herein.

What I claim as my invention is:

1. A stabilized mixture of a sympathomimetically active organic compound having the formula,

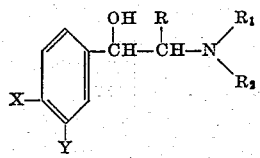

where X and Y are members of the class consisting of —H and —OH, at least one of X and Y being —OH, and R, R₁ and R₂ are members of the class consisting of —H and —CH₃, said mixture containing at least a small fraction of 1 percent of an iminoaminomethanesulfinic acid compound of the formula,

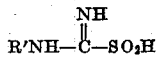

where R' is a member of the class consisting of hydrogen and lower alkyl radicals.

2. A stabilized acidic aqueous solution of a sympathomimetically active organic compound having the formula,

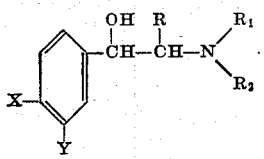

where X and Y are members of the class consisting of —H and —OH, at least one of X and Y being —OH, and R, R₁ and R₂ are members of the class consisting of —H and —CH₃, said solution containing at least a small fraction of 1 percent of an iminoaminomethanesulfinic acid compound of the formula,

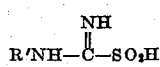

where R' is a member of the class consisting of hydrogen and lower alkyl radicals.

3. A stabilized acidic aqueous solution of a sympathomimetically active organic compound having the formula,

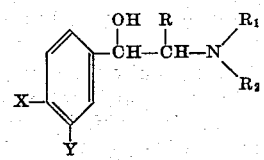

where X and Y are member of the class consisting of —H and —OH, at least one of X and Y being —OH, and R, R₁ and R₂ are members of the class consisting of —H and —CH₃, said solution containing at least a small fraction of 1 percent of iminoaminomethanesulfinic acid of formula,

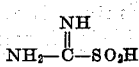

4. A stabilized acidic aqueous solution of a sympathomimetically active organic compound having the formula,

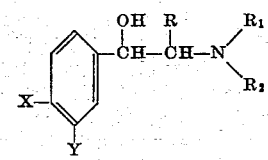

where X and Y are members of the class consisting of —H and —OH, at least one of the X and Y being —OH, and R, R₁ and R₂ are members of the class consisting of —H and —CH₃ said solution containing at least a small fraction of 1 percent of n-propylaminoiminomethanesulfinic acid of formula,

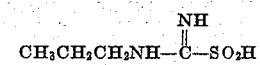

5. A stabilized acidic aqueous solution of a sympathomimetically active organic compound having the formula,

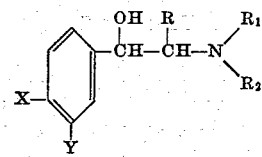

where X and Y are members of the class consisting of —H and —OH, at least one of X and Y being —OH, and R, R₁ and R₂ are members of the class consisting of —H and —CH₃, said solution containing at least a small fraction of 1 percent of n-butylaminoiminomethanesulfinic acid of formula,

6. Stabilized acidic aqueous solutions of sympathomimetic compounds of formula,

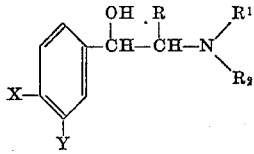

where X and Y are members of the class consisting of —H and —OH, at least one of X and Y being —OH, and R, R₁ and R₂ are members of the class consisting of —H and —CH₃, containing stabilizing amounts from a small fraction of 1 percent up to about 3 percent of an iminoaminomethanesulfinic acid compound of formula,

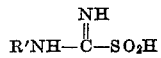

where R' is a member of the class hydrogen and lower alkyl radicals.

7. Stabilized acidic aqueous solutions of sympathomimetic compounds of formula,

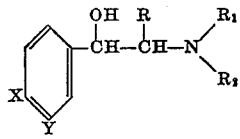

where X and Y are members of the class consisting of —H and —OH, at least one of X and Y being —OH, and R, R₁ and R₂ are members of the class consisting of —H and —CH₃, containing stabilizing amounts from a small fraction of 1 percent up to about 3 percent of iminoaminomethanesulfinic acid.

8. Stabilized acidic aqueous solutions of epinephrine containing stabilizing amounts from a small fraction of 1 per cent up to about 3 per cent of an iminoaminomethanesulfinic acid compound of formula,

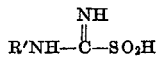

where R' is a member of the class hydrogen and lower alkyl radicals.

9. Stabilized acidic aqueous solutions of epinephrine containing stabilizing amounts from a small fraction of 1 per cent up to about 3 per cent of iminoaminomethanesulfinic acid.

10. Stabilized acidic aqueous solutions of epinephrine containing about 1 per cent of iminoaminomethanesulfinic acid.

11. Stabilized acidic aqueous solutions of epinephrine containing about 1 per cent of n-butylaminoiminomethanesulfinic acid.

12. The method of stabilizing epinephrine and compositions containing the same against discoloration and loss of sympathomimetic activity which comprises incorporating therewith under acidic conditions stabilizing amounts from a small fraction of 1 per cent up to about 3 per cent of an iminoaminomethanesulfinic acid compound of the formula,

where R' is a member of the class consisting of hydrogen and lower alkyl radicals.

13. The method of stabilizing epinephrine and compositions containing the same against discoloration and loss of sympathomimetic activity which comprises incorporating therewith under acidic conditions stabilizing amounts from a small fraction of 1 per cent up to about 3 per cent of iminoaminomethanesulfinic acid of the formula,

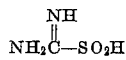

14. The method of stabilizing epinephrine and compositions containing the same against discoloration and loss of sympathomimetic activity which comprises incorporating therewith under acidic conditions stabilizing amounts from a small fraction of 1 per cent up to about 3 per cent of propylaminoiminomethanesulfinic acid of the formula,

15. The method of stabilizing epinephrine and compositions containing the same against discoloration and loss of sympathomimetic activity which comprises incorporating therewith under acidic conditions stabilizing amounts from a small fraction of 1 per cent up to about 3 per cent of n-butylaminoiminomethanesulfinic acid of the formula,

16. The method of stabilizing aqueous solutions of epinephrine which consists of dissolving therein under acidic conditions iminoaminomethane sulfinic acid in amount sufficient to make the concentration of said acid from a fraction of one per cent up to about three per cent.

17. The method of stabilizing aqueous solutions of epinephrine which consists of dissolving therein under acidic conditions n-propylaminoiminomethanesulfinic acid in amount sufficient to make the concentration of said acid from a fraction of one per cent up to about three per cent.

18. The method of stabilizing aqueous solutions of epinephrine which consists of dissolving therein under acidic conditions n-butylaminoiminomethanesulfinic acid in amount sufficient to make the concentration of said acid from a fraction of one per cent up to about three per cent.

EDWARD W. TILLITSON.

REFERENCES CITED

The following references are of record in the file of this patent:

UNITED STATES PATENTS

| Number | Name | Date |
| --- | --- | --- |
| 2,047,144 | Kharasch | July 7, 1936 |
| 2,130,322 | Kharasch | Sept. 13, 1938 |